June 30, 1936.  C. A. MacFARLANE  2,045,990

COLOR HARMONY TESTING MEANS

Filed Oct. 5, 1934

Inventor
Charles A. MacFarlane
by Wright Brown Quinby & May
attys.

Patented June 30, 1936

2,045,990

UNITED STATES PATENT OFFICE 2,045,990

COLOR HARMONY TESTING MEANS

Charles A. MacFarlane, White Plains, N. Y., assignor to Eastern Manufacturing Company, South Brewer, Maine, a corporation of Maine Application October 5, 1934, Serial No. 746,964

8 Claims. (Cl. 35—50)

This invention relates to means for facilitating the comparison of colors, as, for example, to facilitate a proper choice of colored inks to be used in printing on selected colored paper. It has for one of its objects to provide such a harmony testing means associated in a convenient manner with samples showing variously colored papers, in such a way that a printer or other user of paper may be informed as to the colors of paper that are suitable and available, and may determine the colors of printing inks which may be used to best advantage with any selected color of paper.

To this end, in accordance with this invention, samples showing paper of the various colors available are mounted in convenient form such as in a book, each sample having a cut-out portion through which may be presented at will surfaces showing the colors of colored inks available so that such ink colors will be presented in juxtaposition to the colored paper. Preferably also two colors of ink may be presented simultaneously to any desired paper sample and in juxtaposition to each other, though one or more than two may be presented simultaneously if desired. In order that this may be done easily and conveniently the ink colors may be arranged in segments of one or more disks, which are pivoted to a part of the sample book such as an extension of a cover, and which may be brought selectively beneath any desired sample paper to show the ink colors through the cut-out portion of the sample and into registry with which the different ink color areas may be selectively presented by rotation of their carrying disks. When a plurality of color-carrying disks are employed they may be concentrically journaled, and the upper disks have cut-outs of smaller size than the cut-outs through the paper samples so that the colors from the disk or disks beneath may show through. Preferably one side of each cut-out is so formed that the corresponding side in the paper sample cut-out, and in any disk cut-out, may coincide so that colors on all the disks may show at this side in juxtaposition to the sample paper.

For a more complete understanding of this invention, reference may be had to the accompanying drawing in which Figures 1, 2 and 3 are perspective views showing the front cover, the color paper samples, and the back cover, respectively, of a sample book made according to the invention.

Figure 1:
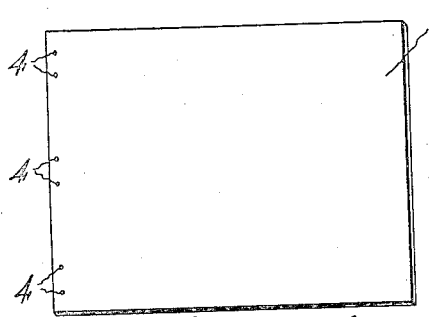
Figure 4:
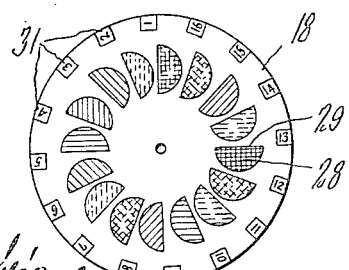
Figures 4 and 5 are plan view of a pair of color disks to be assembled with the book cover shown in Figure 3.
Figure 2:
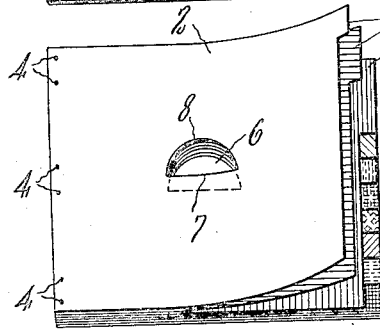
Figure 3:
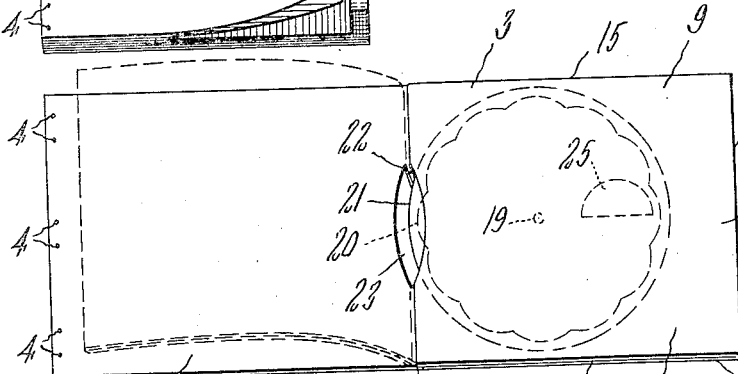

Referring to the drawing, Figures 1, 2 and 3 show a front cover 1, a center filling 2, and a rear cover 3 of a sample book which may be secured together along one edge as by staples passed through at 4. The front cover 1 may be of plain paper or cardboard which may, if desired, have suitable printed matter thereon. The filling shown in Figure 2 may comprise superposed sheets 5 of different colored paper, these representing samples of paper which are available to the purchaser. For ease in picking out a sample leaf of any color desired, the end edges of the samples may be cut away to different extents so as to show marginal portions of each sample when the samples are arranged close together. Each of these samples is shown as provided substantially centrally with a cut-out portion 6. Preferably this is substantially semicircular in outline having a straight side 7 and a curved side 8.

Figure 5:
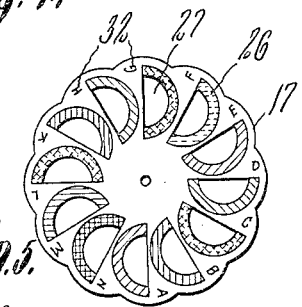
Figure 7:
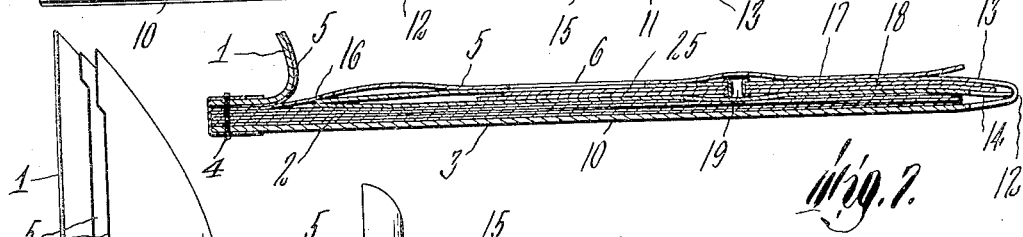
Figure 7 is a section on line 7—7 of Figure 6, but with the sample sheet down in flat position.

The back cover of the book comprises a cover portion 10 similar to the front cover 1, but preferably provided with an extension 11 hinged thereto as at 12. This extension, as shown, may comprise two layers of material such as 13 and 14 which may be secured together along their side edges as at 15 and formed by folding at their outer edge 16, to constitute a pocket-like carrier member within which may be positioned the disks 17 and 18. These disks are shown as pivoted concentrically at 19 to the layers 13 and 14, as by an eyelet, so as to present edge portions at 20 and 21 projecting through an edge cut-out portion 22 of the cover extension and a mating cut-out portion 23 of the main back cover. When the extension 11 is folded over toward the binding edge portion of the cover members and the filler, and beneath any selected sample sheet 2, as shown in Figure 7, a cut-out portion in the front member 13 as at 25 comes into registry with the cut-out 6 of the superposed sample, and through this cut-out 25 color areas such as 26 in adjacent segmental areas 7 on the uppermost disk 17 may be selectively presented by rotation of the disk 17. These color areas, as shown in Figure 5, are preferably semicircular in outline and through each of these colored areas is a semicircular cut-out 27 having its straight side coincident with that of the colored area and arranged radially of the disk 17. Through these cut-outs 27 may be selectively presented to view similarly shaped colored areas 28 in adjacent segments of the disk 18, each of these colored areas having a straight side 29 arranged radially of the disk. The colored areas on the disks 17 and 18 are arranged to present colors of printing inks available, and by bringing combinations of different colors into juxtaposition to the colored paper at the cut-out 6, the colors being exposed through the cut-out portions, the suitability of any ink color for use with the paper of the color of the sample may be determined.

By using semicircular cut-outs and color areas, color areas of relatively large and pleasing contour are provided, and the straight side permits bringing into juxtaposition with the paper sample color areas of both disks simultaneously, while maintaining a pleasing symmetry of outline.

Figure 6:
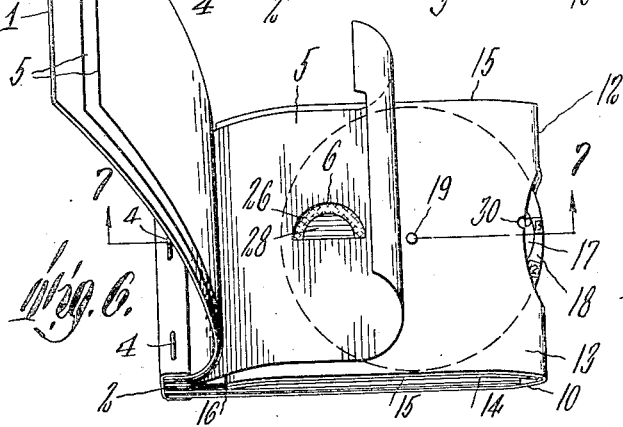
Figure 6 is a perspective of the sample book in use, one of the paper samples being shown partly lifted.

As shown best in Figure 6, the slide 15 of the cover extension may be provided with a notch or other suitable indicating means as at 30 with which corresponding indications 31 on the disk 18, and indications 32 on the disk 17 may be brought into registry to identify the corresponding colored areas of the respective disks which are visible through the cut-outs in the cover extension and the sample paper.

From the foregoing description of an embodiment of this invention, it should be evident to those skilled in the art that various changes and modifications might be made without departing from the spirit or scope of this invention as defined by the appended claims.

I claim:

1. A device of the class described, comprising a pair of disks each having in adjacent segmental portions colored areas, said disks being pivoted in overlapping relation, the upper disk having openings through which the colored areas of the lower disks may be selectively presented, and a carrier for said disks to which they are pivoted, said carrier having a front sheet material piece having a cut-out larger than the cut-outs of said upper disk and through which the colored areas of said upper disk and the colored areas of said lower disk showing through the cut-outs of said upper disk may be selectively presented.

2. A device of the class described, comprising a pair of disks each having in adjacent segmental portions colored areas, said disks being pivoted in overlapping relation, the upper disk having openings through which the colored areas of the lower disks may be selectively presented, and a carrier for said disks to which they are pivoted, said carrier having a front sheet material piece having a cut-out larger than the cut-outs of said upper disk and through which the colored areas of said upper disk and the colored areas of said lower disk showing through the cut-outs of said upper disk may be selectively presented, said cut-outs of said disk and carrier piece being semicircular in outline with the straight faces coincident with radial lines on said disks and said disks being pivoted concentrically.

3. A device of the class described, comprising a book having leaves presenting samples of different colored sheet material, each sample having a cut-out portion, a cover for said book, and color samples movably secured to said cover in position to be presented selectively into registration with the cut-outs of said samples.

4. A device of the class described, comprising a book having leaves presenting samples of different colored sheet material, each sample having a cut-out portion, a cover for said book, an extension hinged to said cover to be folded back beneath any selected of said sheet material samples, and color samples movably secured in said extension in position to be presented selectively into registration with the cut-outs of said sheet material samples.

5. A device of the class described, comprising a book having leaves presenting samples of different colored paper, each having a cut-out portion, a cover for said book, and an extension hinged to said cover and having front and back portions, a disk pivoted between said front and back portions and having a margin projecting from between said portions by which it may be turned, said extension being foldable about its hinge connection with said cover beneath any selected of said leaves, and having a cut-out in registry with the cut-out of said selected leaf, said disk having differently colored areas in adjacent segments which may be brought selectively into registry with said cut-outs by rotation of said disk.

6. A device of the class described, comprising a book having leaves presenting samples of different colored paper, each having a cut-out portion, a cover for said book, and an extension hinged to said cover and having front and back portions, a disk pivoted between said front and back portions, said extension and adjacent cover portion having a cut-out through which the margin of said disk projects and by which said disk may be turned, said extension being foldable about its hinge connection with said cover beneath any selected of said leaves, and having a cut-out in registry with the cut-out of said selected leaf, said disk having differently colored areas in adjacent segments which may be brought selectively into registry with said cut-outs by rotation of said disk.

7. A device of the class described, comprising a book having leaves presenting samples of different colored paper, each having a cut-out portion, a cover for said book, and an extension hinged to said cover and having front and back portions, a pair of superposed disks pivoted between said front and back portions and having margins projecting from between said portions by which they may be turned, said extension being foldable about its hinge connection with said cover beneath any selected of said leaves, and having a cut-out in registry with the cut-out of said selected leaf, the upper of said disks when said extension is in such position having different colored areas selectively visible through said cut-outs, and cut-outs through its colored areas of less size than said leaf cut-outs and through which different colored areas of the other disk may be selectively exposed.

8. A device of the class described comprising a book having leaves of different colors, each of said leaves having a cut-out portion, the several cut-out portions being in registry, a cover for said book and within which said leaves are bound, said cover having an extension hinged to one of its free ends, said extension comprising front and back portions, a pair of superposed disks of different diameters pivoted coaxially between said front and back portions and having margins projecting from between said portions by which said disks may be individually turned, said extension being foldable about its hinged connection with said cover beneath any selected of said leaves and having a cut-out in its front portion when so folded registering with the cut-out of the superposed leaf, the upper of said disks when in such position having different colored areas selectively positioned opposite to said leaf cut-out and having cut-outs of less size than said leaf cut-outs in each of said areas, and said other disk having areas of different color selectively presentable to view through said disk cut-outs, said leaf and disk cut-outs each having a straight side which may be brought into registry whereby a colored area of said other disk may be presented in juxtaposition to any selected leaf.

CHARLES A. MacFARLANE.